(12) United States Patent
Beckmann et al.

(10) Patent No.: US 10,480,606 B2
(45) Date of Patent: Nov. 19, 2019

(54) SEPARATING DEVICE AND HYDRAULIC MOUNT

(71) Applicant: Vibracoustic GmbH, Darmstadt (DE)

(72) Inventors: Wolfgang Beckmann, Darmstadt (DE); Gamze Yildirim, Mannheim (DE); Peter Farrenkopf, Viernheim (DE)

(73) Assignee: VIBRACOUSTIC GMBH, Darmstadt (DE)

( * ) Notice: Subject to any disclaimer, the term of this patent is extended or adjusted under 35 U.S.C. 154(b) by 0 days.

(21) Appl. No.: 15/743,307

(22) PCT Filed: Jul. 12, 2016

(86) PCT No.: PCT/EP2016/066489
§ 371 (c)(1),
(2) Date: Jan. 10, 2018

(87) PCT Pub. No.: WO2017/009318
PCT Pub. Date: Jan. 19, 2017

(65) Prior Publication Data
US 2018/0202510 A1  Jul. 19, 2018

(30) Foreign Application Priority Data

Jul. 15, 2015 (DE) ........................ 10 2015 111 505

(51) Int. Cl.
*F16F 13/10* (2006.01)
(52) U.S. Cl.
CPC .......... *F16F 13/106* (2013.01); *F16F 13/107* (2013.01)

(58) Field of Classification Search
CPC ........ F16F 13/10; F16F 13/105; F16F 13/106; F16F 13/1427
See application file for complete search history.

(56) References Cited

U.S. PATENT DOCUMENTS

| 4,159,091 A | * | 6/1979 | Le Salver | ............. | F16F 9/3415 |
| | | | | | 248/634 |
| 8,454,002 B2 | | 6/2013 | Nishi et al. | | |
| 2003/0080482 A1 | | 5/2003 | Desmoulins et al. | | |

(Continued)

FOREIGN PATENT DOCUMENTS

| DE | 3731524 A1 | 4/1989 |
| DE | 112013002243 T5 | 3/2015 |

(Continued)

*Primary Examiner* — Thomas J Williams
(74) *Attorney, Agent, or Firm* — Leydig, Voit & Mayer, Ltd.

(57) ABSTRACT

A separating device for arrangement between a working chamber and a compensation chamber of a hydraulic mount includes a first nozzle plate and a second nozzle plate which is spaced apart from the first nozzle plate at a first distance. An elastic membrane is arranged between the first nozzle plate and the second nozzle plate. The membrane has at least one bump. The bump has a height with respect to the membrane and is designed in such a way that the bump lies against the first nozzle plate and/or the second nozzle plate in a punctiform manner. A thickness of the membrane and the height of the bump in the uninstalled state together are larger than the first distance, such that the membrane is clamped between the first nozzle plate and the second nozzle plate in a punctiform manner.

11 Claims, 4 Drawing Sheets

(56) References Cited

U.S. PATENT DOCUMENTS

| | | |
|---|---|---|
| 2003/0168789 A1 | 9/2003 | Kries et al. |
| 2005/0200060 A1* | 9/2005 | Hiraoka ............... F16F 13/106 267/140.13 |
| 2006/0157902 A1* | 7/2006 | Sakata ............... B60K 5/1208 267/140.13 |
| 2011/0210488 A1 | 9/2011 | Yamamoto et al. |
| 2012/0248669 A1* | 10/2012 | Masuda ............... F16F 13/106 267/140.13 |
| 2014/0246821 A1 | 9/2014 | Koga et al. |
| 2015/0123326 A1 | 5/2015 | Kadowaki |

FOREIGN PATENT DOCUMENTS

| | | |
|---|---|---|
| EP | 1306576 B1 | 8/2005 |
| EP | 1574742 A1 | 9/2005 |
| EP | 1559926 B1 | 11/2007 |
| FR | 2902162 A1 | 12/2007 |
| JP | 2009168183 A | 7/2009 |
| WO | WO 2013005261 A1 | 1/2013 |

* cited by examiner

SEPARATING DEVICE AND HYDRAULIC MOUNT

This application is a U.S. National Stage Application under 35 U.S.C. § 371 of International Application No. PCT/EP2016/066489 filed on Jul. 12, 2016, and claims benefit to German Patent Application No. DE 10 2015 111 505.0 filed on Jul. 15, 2015. The International Application was published in German on Jan. 19, 2017 as WO 2017/009318 A1 under PCT Article 21(2).

FIELD

The invention relates to a separating device for arranging between a working chamber and a compensation chamber of a hydraulic mount comprising a first nozzle plate, a second nozzle plate and a membrane. The membrane is disposed between the first nozzle plate and the second nozzle plate and is elastic. Furthermore, the invention relates to a hydraulic mount comprising a working chamber, a compensation chamber and a separating device arranged between these chambers.

BACKGROUND

Membranes with incisions are used in hydraulically damped engine mounts in nozzle cages to reduce pressure differences between the working chamber and the compensation chamber. In this way, noise in the vehicle resulting from cavitations can be avoided. In order to ensure the function, it is necessary to keep the position of the incisions constant relative to the nozzle cage. In the prior art, this is usually accomplished by a form fit in the decoupled membranes, i.e. in membranes, which can move axially within the nozzle cage. For example, a nose extending in the axial direction is formed on the nozzle cage, wherein the nose engages in a recess of the membrane. Therefore, the membrane can still move axially, while avoiding a rotation of the membrane in the circumferential direction.

An alternative anti-rotation mechanism is described in the documents JP 2009-168183, EP 1 559 926 81, FR 2 902 162 and EP 1 306 576 81. The solution indicated there includes a pin arranged on the membrane wherein the pin engages a hole of the nozzle cage. The height of the pin is such that the form-fit connection between the pin and the hole in the nozzle cage is always ensured regardless of the axial position of the membrane. Thus, the membrane can move axially and is also secured against rotation in the circumferential direction.

SUMMARY

In an embodiment, the present invention provides a separating device for arrangement between a working chamber and a compensation chamber of a hydraulic mount. The separating device includes a first nozzle plate and a second nozzle plate which is spaced apart from the first nozzle plate at a first distance. An elastic membrane is arranged between the first nozzle plate and the second nozzle plate. The membrane has at least one bump. The bump has a height with respect to the membrane and is designed in such a way that the bump lies against the first nozzle plate and/or the second nozzle plate in a punctiform manner. A thickness of the membrane and the height of the bump in the uninstalled state together are larger than the first distance, such that the membrane is clamped between the first nozzle plate and the second nozzle plate in a punctiform manner.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
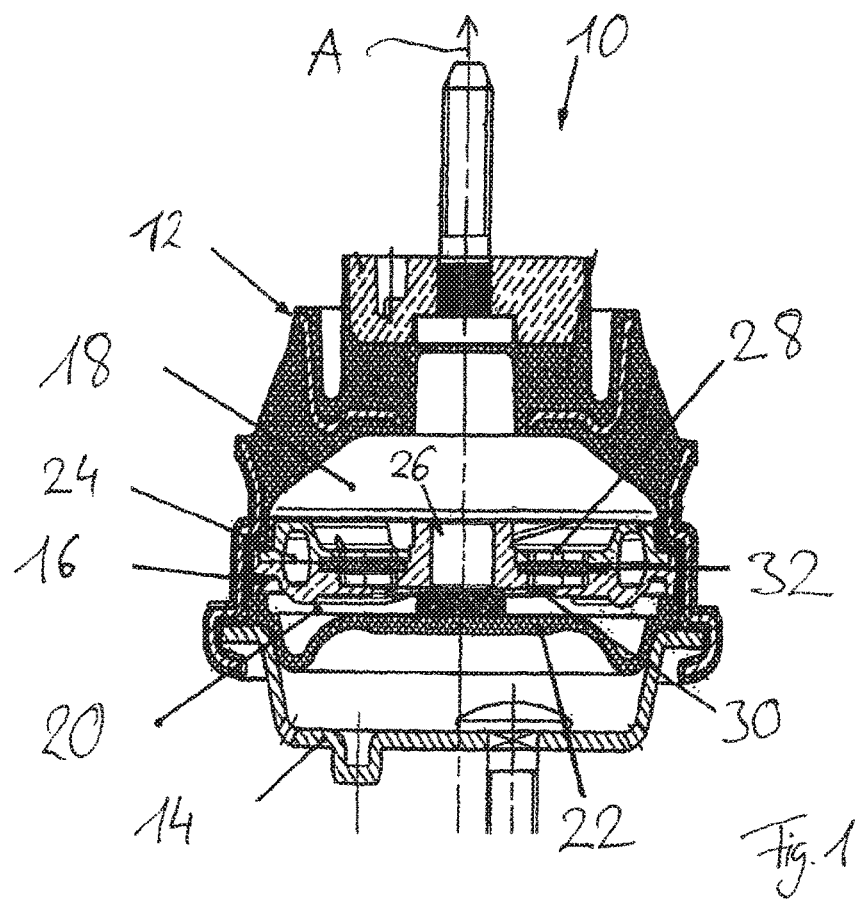
FIG. 1 shows a hydraulic mount having a separating device.

Embodiments of the present invention provide an anti-rotation mechanism for a membrane having a simpler design.

According to an embodiment, the invention provides a separating device to be arranged between a working chamber and a compensation chamber of a hydraulic mount. The separating device comprises a first nozzle plate, a second nozzle plate that is spaced from said first nozzle plate at a first distance, and a membrane. The membrane is disposed between the first nozzle plate and the second nozzle plate and is elastic. Furthermore, the membrane has a thickness. The membrane has at least one bump, which has a height opposite to the membrane. The bump is formed so that it substantially lies against the first and/or second nozzle plate in a punctiform manner. The thickness of the membrane and the height of the bump in the uninstalled state are together larger than the first distance, so that the membrane is clamped between the first nozzle plate and the second nozzle plate in a punctiform manner.

In particular, the separating device is provided between a working chamber and a compensation chamber of a hydraulic mount. The separating device comprises, for example, a nozzle cage. In addition, the separating device may have one or more passageways which can establish a fluid communication between the working chamber and the compensation chamber of the hydraulic mount.

The separating device has a first nozzle plate and a second nozzle plate, which are spaced apart at a first distance from each other. The first nozzle plate and/or the second nozzle plate are preferably plate-shaped. Specifically, the first and the second nozzle plate have a flat surface on the side facing the membrane. The first nozzle plate and/or the second nozzle plate may be provided with one or more openings.

The membrane is arranged between the first nozzle plate and the second nozzle plate such that it can at least partially move in axial direction. In particular, this means that a clearance is provided between the membrane and the first nozzle plate and/or the second nozzle plate. This clearance is filled, for example, with the fluid of the hydraulic mount. In other words, the membrane preferably does not lie against the entire surface of both the first nozzle plate and the second nozzle plate. The membrane is thus axially movable. Since the membrane is elastic, the membrane may deform in an axial direction. Thus for functioning as a separating device, the membrane is not a clamped membrane, but a decoupled membrane.

The thickness of the membrane preferably extends in the axial direction of the membrane. In particular, the axial direction of the membrane is perpendicular to the areal extent of the membrane, in which the circumferential direction is arranged. The first nozzle plate and/or the second nozzle plate preferably extend in the plane of the circumferential direction.

The membrane may be formed of an elastic material such as an elastomer. In particular, the membrane is elastic such that it can deform in certain areas in the axial direction. Preferably, the entire membrane is elastic such that all areas of the membrane are made to deform axially. For example, the membrane is deformed only in the vicinity of an opening in the first nozzle plate and/or the second nozzle plate when a pressure difference between the working chamber and the compensation chamber prevails. Thus, the membrane can be deformed particularly in certain areas in the axial direction, so that, for example, bulges develop on the membrane.

The membrane is substantially formed in a disk-shaped or plate-shaped manner. At least one bump is provided on this substantially plate-like configuration. In particular, the bump is formed locally, so that the bump essentially rests on the first and/or the second nozzle plate in a punctiform manner. The bump has a height relative to the plate-shaped configuration of the membrane so that at this height the tip of the bump surpasses the rest of the membrane.

The height of the bump plus the thickness of the membrane is in a non-installed state, i.e. when the bump and/or the membrane are not compressed, larger than the first distance between the first nozzle plate and the second nozzle plate. Consequently, in the installed state the membrane and/or the bump are compressed between the first nozzle plate and the second nozzle plate. The clamping is carried out only at the location of the bump.

Since the bump is formed in a punctiform manner and thus lies against the first nozzle plate and/or the second nozzle plate in a punctiform manner, the larger part of the membrane of the first nozzle plate and/or the second nozzle plate is spaced so that it continues to be able to deform elastically in the axial direction at locations without a bump. Punctiform in this context means that the area of the bump in the largest cross-section perpendicular to the axial direction of the bump is less than 1% of the area of the membrane. Preferably, the area of the bump is less than 0.5% and in particular less than 2%. Preferably, the area via which the bump rests on the first and/or the second nozzle plate is smaller than the largest cross-section of the bump.

The provision of at least one bump, which clamps the membrane in a punctiform manner or locally between the first nozzle plate and the second nozzle plate, has the preferred advantage that the membrane cannot rotate in the circumferential direction, since the membrane is clamped. However, since the bump is formed in a punctiform manner or locally, the axial deformability of the membrane and thus the axial mobility of the membrane is only negligibly influenced. The behavior of the membrane thus preferably essentially corresponds to a decoupled membrane, while providing an anti-rotation mechanism at the same time.

Another preferred advantage of the bump is that during installation of the membrane into the nozzle plate, the arrangement of the membrane relative to the nozzle plate is not crucial, since a clamping of the membrane between the first nozzle plate and the second nozzle plate always takes place with a suitable arrangement of the bump. Consequently, the manufacturing of the separating device is simplified.

Furthermore, in comparison to the state of the art, there is no need for an opening or a projection in the separating device for the fixation of the membrane. Thus, the structure of the separating device can also be simplified.

Preferably, the bump comprises a first side portion which projects from a first side of the membrane and a second side portion which projects from a second side of the membrane.

Preferably, the first side portion of the bump projects from the membrane in the direction of the first nozzle plate. In particular, the second side portion projects from the membrane from the second side which faces the second nozzle plate. The provision of a first side portion and a second side portion has the preferred advantage that the membrane is spaced apart from both the first nozzle plate and the second nozzle plate so that they deform in both the direction of the first nozzle plate and in the direction of the second nozzle plate, when there is a pressure difference between the working chamber and the compensation chamber. In particular, the height of the bump is thus made up of the height of the first side portion and the height of the second side portion.

Preferably, the bump is formed in an elastic manner, whereby the membrane and the bump are preferably integrally formed of the same material.

In this preferred embodiment both the membrane and the bump of the clamping between the first nozzle plate and the second nozzle plate is compressed. Preferably, the membrane and the bump are integrally formed of the same material, so that the manufacturing of the membrane can be further simplified. In particular, a well-known membrane from the prior art is used, wherein the bump is further formed during the manufacturing.

Preferably, the first side portion and/or the second side portion are formed conically or hemispherically. As stated above, the cross-sectional area of the bump is the cross-sectional area perpendicular to the axial direction, which has the largest area. Thus, at a conically or hemispherically formed bump it is the surface that is positioned adjacent the remaining surface of the membrane. In a conical or hemispherical design of the bump, the area with which the bump rests on the first nozzle plate and/or the second nozzle plate is preferably smaller than the largest cross-sectional area. Thus, this contact surface is smaller than the cross-sectional area near the membrane, so that the clamping can occur in a punctiform manner and locally.

Preferably, the first nozzle plate and/or the second nozzle plate have at least one opening, wherein preferably the membrane has at least one incision, which is associated with the opening.

Preferably several incisions are provided. In particular, the number of the incisions is determined by the number of openings. For example, every second incision is located opposite an opening.

Since the membrane is made elastic, the incision can elastically deform at a pressure difference between the working chamber and the compensation chamber, thereby forming an opening in the membrane. In order to facilitate the flow of fluid between the working chamber and the compensation chamber, the incision corresponds to an opening in the first nozzle plate and/or the second nozzle plate. In particular, the first nozzle plate and the second nozzle plate each have such an opening which is arranged congruently in the axial direction. In particular, the incision is provided between the two openings. Due to the local clamping of the membrane due to the bump, the behavior of the membrane is only slightly changed compared to an elastic membrane without a bump, also with regard to the possibility of opening the incision at a pressure difference.

Preferably, the membrane has an inner edge portion, an outer edge portion and an intermediate portion disposed between the inner edge portion and the outer edge portion, wherein the incision is arranged in the intermediate portion. The inner edge portion and/or the outer edge portion can have a different elasticity in comparison with the intermediate portion. However, it is preferred that the inner edge portion, the outer edge portion and the intermediate portion are integrally formed of the same material.

Preferably, a first projection is arranged at the intermediate portion, wherein preferably a second bump is disposed at the outer edge portion.

The provision of the second bump on the outer edge portion has the preferred advantage that the distance between the second bump and the incision is large, so that influence on the behavior of the membrane near the incision is only marginally influenced by the second bump. Preferably, the first nozzle plate and/or the second nozzle plate have no opening in the edge portion, so that the membrane is always clamped independently of the arrangement in the circumferential direction between the first nozzle plate and the second nozzle plate. Thus, mounting of the membrane can be simplified.

Preferably, the height of the first side portion and/or the second side portion is at least 0.2 mm and at most 0.7 mm and particularly 0.5 mm in size.

If only a first side portion is provided then the membrane is spaced apart by these amounts from the first nozzle plate. Are both a first side portion and a second side portion provided then the membrane is spaced apart on both sides of the first nozzle plate and the second nozzle plate by the distances mentioned above, so that it is centered. It has been shown that compared to a completely uncoupled membrane at these heights of the bump the axial behavior of the membrane is only negligibly influenced.

Preferably, a maximum of four bumps are provided on the membrane. In particular, three second bumps are provided on the edge portion and a first bump is provided on the intermediate portion. This embodiment provides a particularly good anti-rotation mechanism while only slightly changing the axial behavior of the membrane compared to a completely uncoupled membrane.

Furthermore, the invention relates to a hydraulic mount that, as described above, includes a working chamber, a compensation chamber and a separating device. The separating device is disposed between the working chamber and the compensation chamber.

Preferably, the above considerations and advantages with regard to the separating device apply to the hydraulic mount.

The hydraulic mount 10 shown in FIG. 1 has a support element 12 and a housing 14 which forms the support. A separating device 16 is arranged between the support element 12 and the support 14, wherein the separating device 16 divides the hydraulic mount 10 into a working chamber 18 and a compensation chamber 20. The working chamber 18 is thus limited by the support element 12 and the separating device 16, while the compensation chamber 20 is limited by the separating device 16 and a decoupled membrane 22.

The separating device has an overflow channel 24, a channel 26, a first nozzle plate 28, a second nozzle plate 30 and a membrane 32, as shown in FIG. 1. The overflow channel 24 and the channel 26 present a fluid communication between the working chamber 18 and the compensation chamber 20. The arrangement of overflow 24 and channel 26 can be seen in the top view of the separating device 16 illustrated in FIG. 2.

The membrane 32 is arranged between the first nozzle plate 28 and the second nozzle plate 30. The first nozzle plate 28 and the second nozzle plate 30 have six openings 34, which are arranged congruently in an axial direction A. The first nozzle plate 28 and the second nozzle plate 30 are spaced apart by a first distance in the axial direction A. The axial direction A corresponds to the axial direction of the hydraulic mount 10. A circumferential direction U is perpendicular to the axial direction A.

Figure 2:
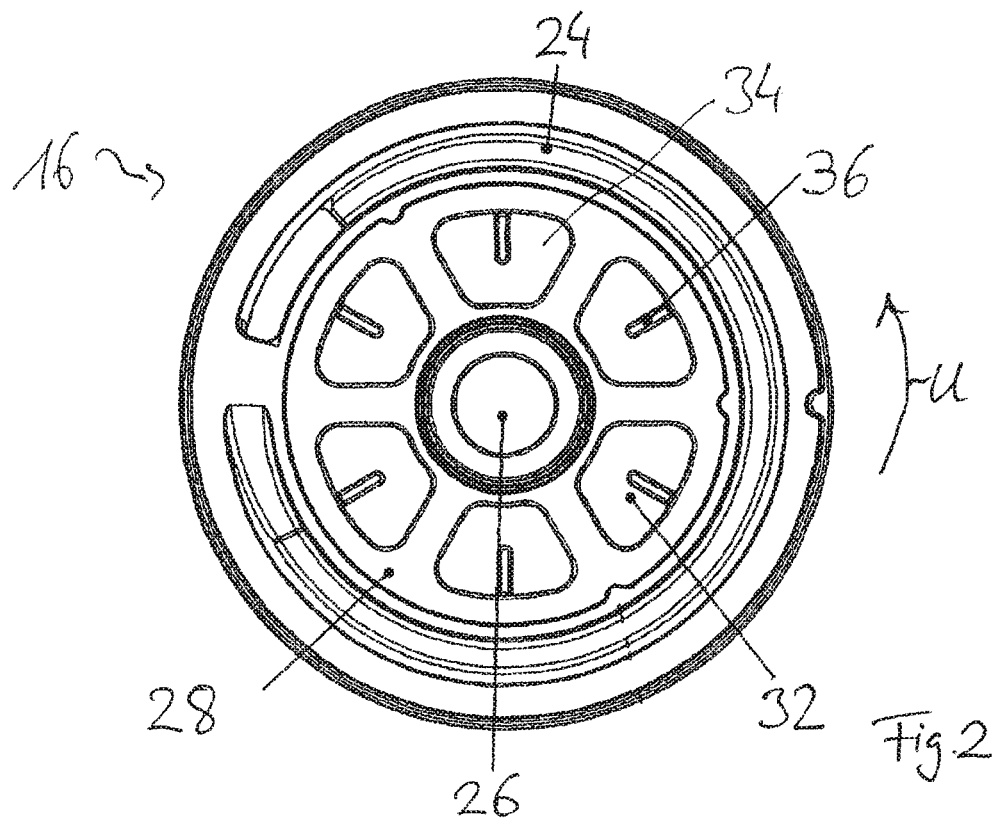
FIG. 2 shows a plan view of the separating device having a membrane.
Figure 3:
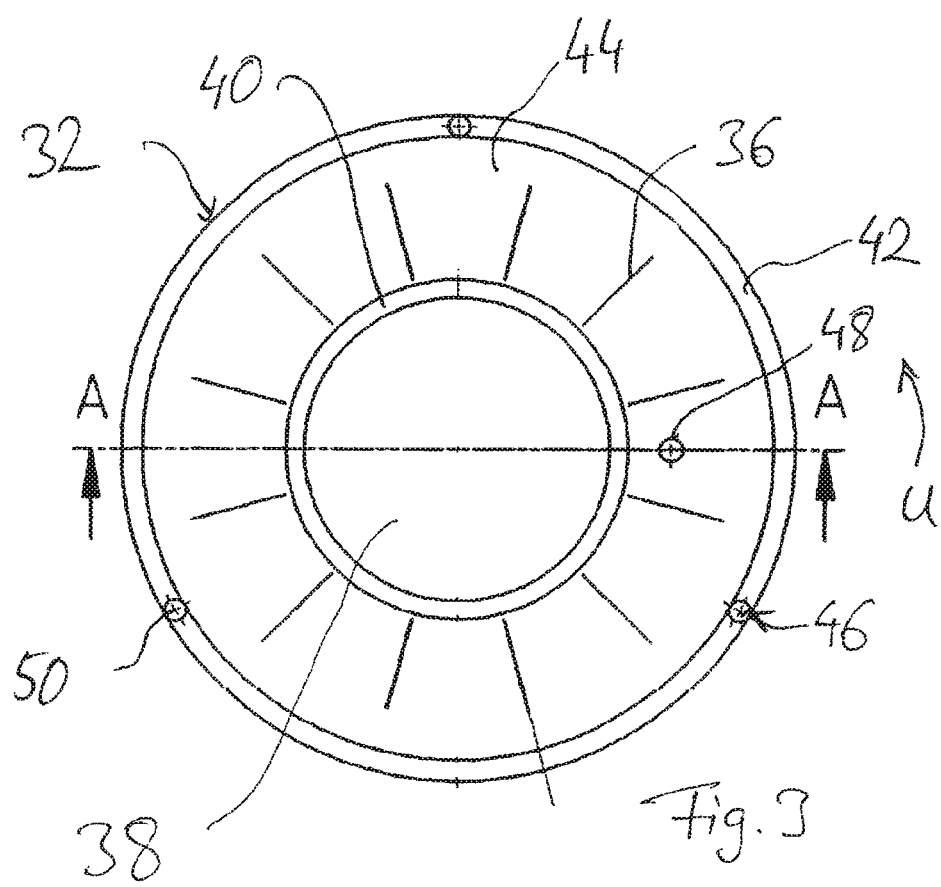
FIG. 3 shows a plan view of the membrane.
Figure 4:
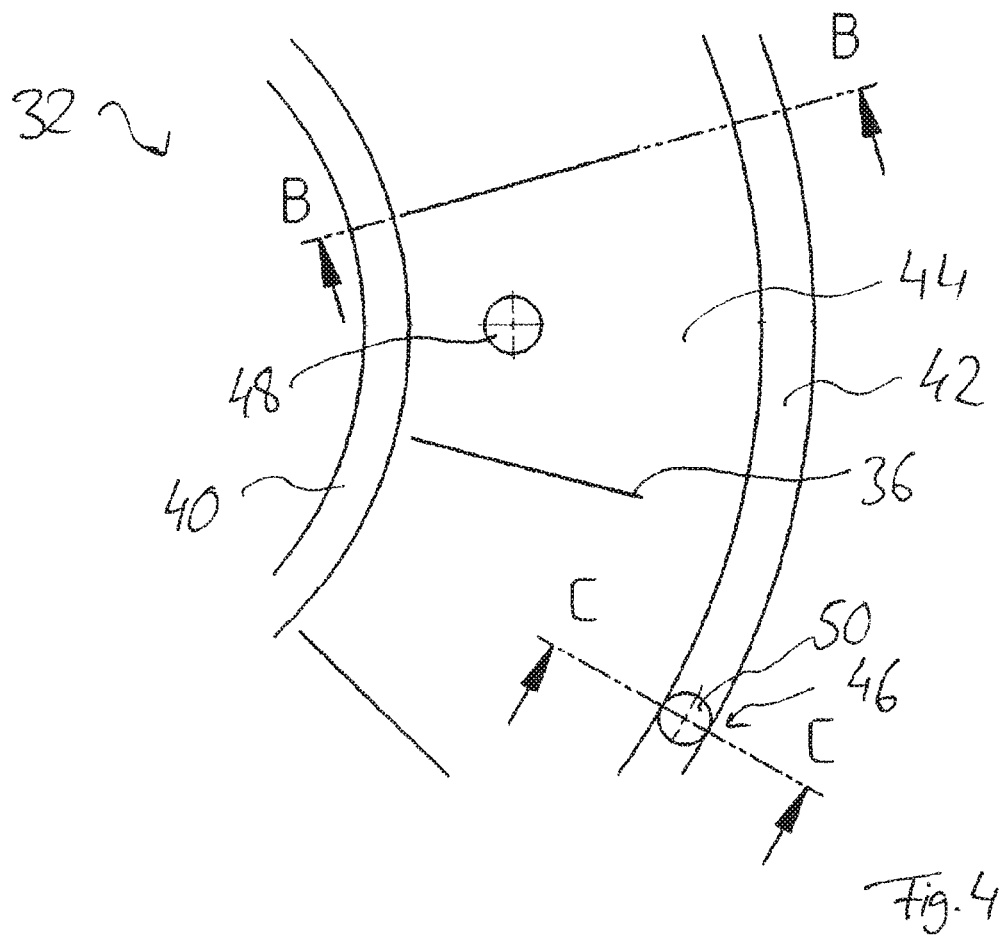
FIG. 4 shows an enlarged section of the membrane of FIG. 3.

As can be seen from FIG. 3, twelve incisions 36 are provided in the membrane 32 in the circumferential direction U, of which only six are visible in FIG. 2. Seen in the axial direction A, the incisions 36 are respectively associated with the apertures 34, wherein every second incision 36 is opposite the opening 34. Thus, fluid from one chamber can flow via the openings 34 and the incisions 36 at a pressure difference between the working chamber 18 and the compensation chamber 20, because the membrane 32 is made elastic and thus the incisions 36 open when a pressure is applied.

Figure 5:
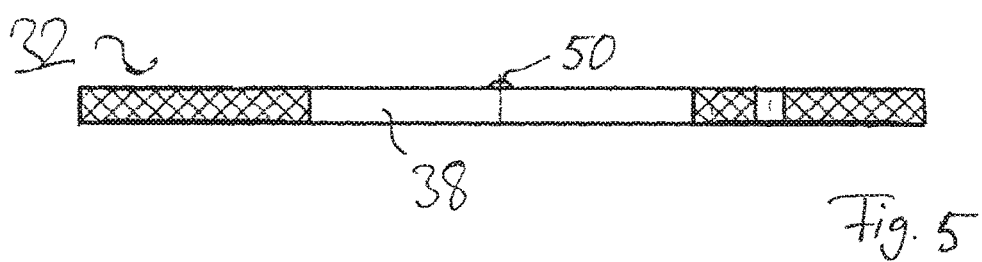
FIG. 5 shows a cross-sectional view of the membrane taken along the line A-A in FIG. 3.
Figure 6:
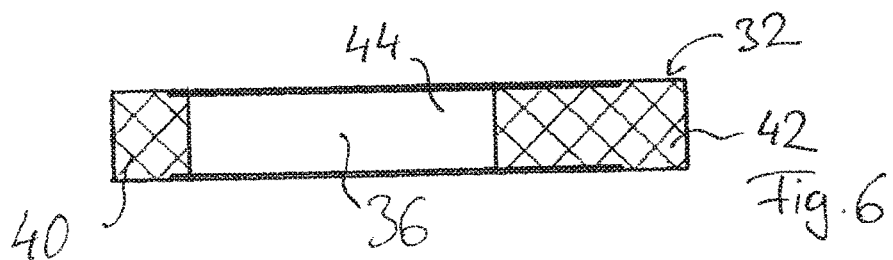
FIG. 6 shows a cross-sectional view of the membrane taken along the line B-B in FIG. 4.

As shown in FIG. 3, the membrane 32 has at its center a recess 38, in which the channel 26 can be received. The membrane 32 has an inner edge portion 40, an outer edge portion 42 and an intermediate portion 44. The intermediate portion 44 is located between the inner edge portion 40 and the outer edge portion 42. The incisions 36 are provided in the intermediate portion 44. In addition, the membrane 32 in the embodiment shown in FIG. 3 has four bumps 46. The bumps 46 are shown in FIG. 3 with an enlarged cross-sectional area. The bumps 46 each take up less than 1% of the area in the plane of the circumferential direction U of the membrane 32. The bumps 46 each have a first bump 48, which are arranged in the intermediate portion 44, and three second projections 50, which are arranged in the outer edge portion 42. The arrangement of the incisions 36 and the recess 38 is illustrated again in the cross sections of FIGS. 5 and 6.

Figure 7:
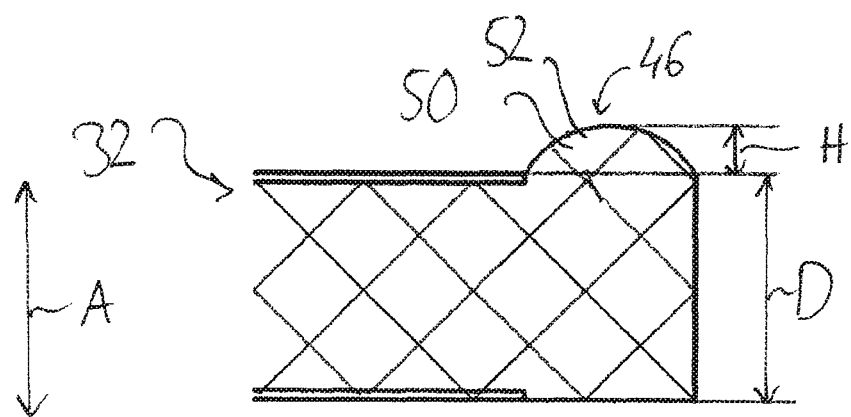
FIG. 7 shows a cross-sectional view of the membrane taken along line C-C in FIG. 4.

As shown in FIG. 7, the bump 46 and the membrane 32 are integrally formed of the same material. In the axial direction A, the membrane has a thickness D and the bump has a height H. In the embodiment shown in FIG. 7, the bump 46 has only a first side portion 52. A second side portion opposite the first side portion 52 is not provided in the embodiment shown in FIG. 7. In an uncompressed state of the membrane 32 and the bumps 46, i.e. in a non-mounted state, the sum of the thickness D and the height H is larger than the first distance of the first nozzle plate 28 and the second nozzle plate 30 in the axial direction A.

The mode of operation of the anti-rotation mechanism is as follows. The membrane 32 is clamped by means of bumps 46 between the first nozzle plate 28 and the second nozzle plate 30. Since four projections 46 are provided, the membrane 32 is clamped locally at only these four points. The four bumps thus provide the anti-rotation mechanism. Since the bumps 46 have a cross sectional area that is significantly smaller than the area of the membrane 32, the remaining behavior of the membrane 46 in the axial direction A is only slightly influenced by the projections. A decoupled membrane 32 can therefore be provided with an anti-rotation mechanism.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS 10 hydraulic mount
12 support element
14 housing
16 separating device
18 working chamber
20 balance chamber
22 decoupled membrane
24 overflow channel
26 channel
28 first nozzle plate
30 second nozzle plate
32 membrane
34 openings
36 incision
38 recess
40 inner edge portion
42 outer edge portion
44 intermediate portion
46 bump
48 first bump
50 second bump
52 first side portion
A axial direction
D thickness
H height
U circumferential direction

The invention claimed is:

1. A separating device for arrangement between a working chamber and a compensation chamber of a hydraulic mount, the separating device comprising:

a first nozzle plate;
a second nozzle plate which is spaced apart from the first nozzle plate at a first distance; and
an elastic membrane arranged between the first nozzle plate and the second nozzle plate, the membrane having at least one bump, the at least one bump having a height with respect to the membrane and being configured such that the at least one bump lies against the first nozzle plate and/or the second nozzle plate in a punctiform manner,
wherein a thickness of the membrane and the height of the at least one bump in an uninstalled state together are larger than the first distance, such that the membrane is held between the first nozzle plate and the second nozzle plate in a punctiform manner, such that the membrane is only held at a location of the at least one bump,
wherein the first nozzle plate and/or the second nozzle plate have at least one opening,
wherein the membrane has at least one incision which corresponds to the at least one opening, and
wherein the membrane has an inner edge portion, an outer edge portion, and an intermediate portion arranged between the inner edge portion and the outer edge portion, the at least one incision being disposed in the intermediate portion.

2. The separating device according to claim 1, wherein the at least one bump comprises a first side portion projecting from a first side of the membrane and a second side portion projecting from a second side of the membrane.

3. The separating device according to claim 1, wherein the at least one bump is elastic.

4. The separating device according to claim 2, wherein the first side portion and/or the second side portion are formed conically or hemispherically.

5. The separating device according to claim 1, wherein the at least one bump is arranged at the intermediate portion.

6. The separating device according to claim 2, wherein a height of the first side portion and/or the second side portion is at least 0.2 mm and at most 0.7 mm.

7. The separating device according to claim 1, wherein the at least one bump comprises no more than four bumps.

8. The separating device according to claim 3, wherein the membrane and the at least one bump are integrally formed of the same material.

9. The separating device according to claim 5, wherein the at least one bump comprise a first bump and a second bump, and
wherein the second bump is arranged at the outer edge portion.

10. The separating device according to claim 6, the height of the first side portion and/or the second side portion is 0.5 mm.

11. A hydraulic mount, comprising:
a working chamber;
a compensation chamber; and
a separating device arranged between the working chamber and the compensation chamber, the separating device comprising:
a first nozzle plate;
a second nozzle plate which is spaced apart from the first nozzle plate at a first distance; and
an elastic membrane arranged between the first nozzle plate and the second nozzle plate, the membrane having at least one bump, the at least one bump having a height with respect to the membrane and being configured such that the at least one bump lies against the first nozzle plate and/or the second nozzle plate in a punctiform manner, wherein a thickness of the membrane and the height of the at least one bump in an uninstalled state together are larger than the first distance, such that the membrane is held between the first nozzle plate and the second nozzle plate in a punctiform manner, such that the membrane is only held at a location of the at least one hump, wherein the first nozzle plate and/or the second nozzle plate have at least one opening, wherein the membrane has at least one incision which corresponds to the at least one opening, and wherein the membrane has an inner edge portion, an outer edge portion, and an intermediate portion arranged between the inner edge portion and the outer edge portion, the at least one incision being disposed in the intermediate portion.

* * * * *